Fig. 5,
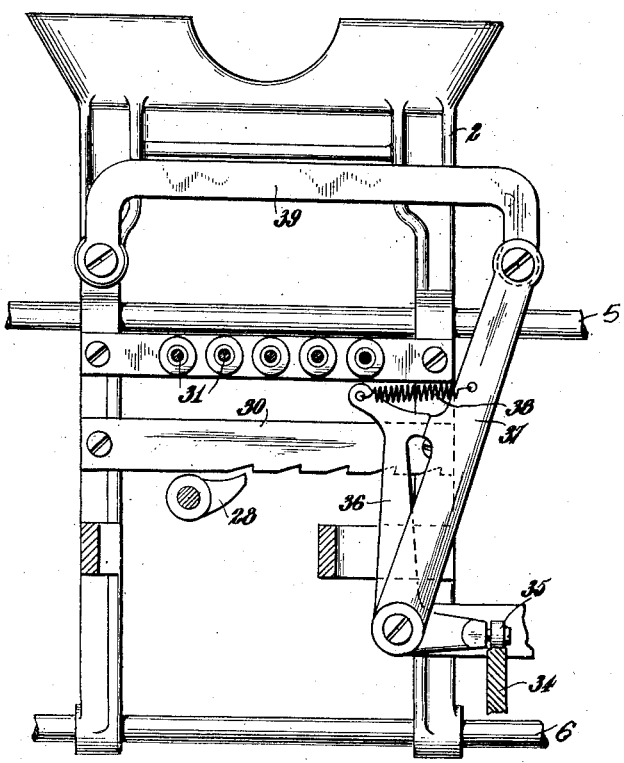
Fig. 6,
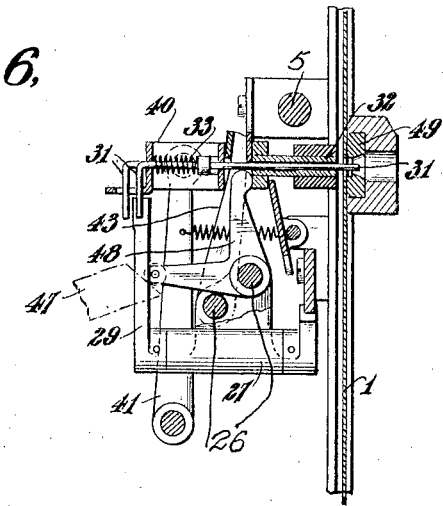

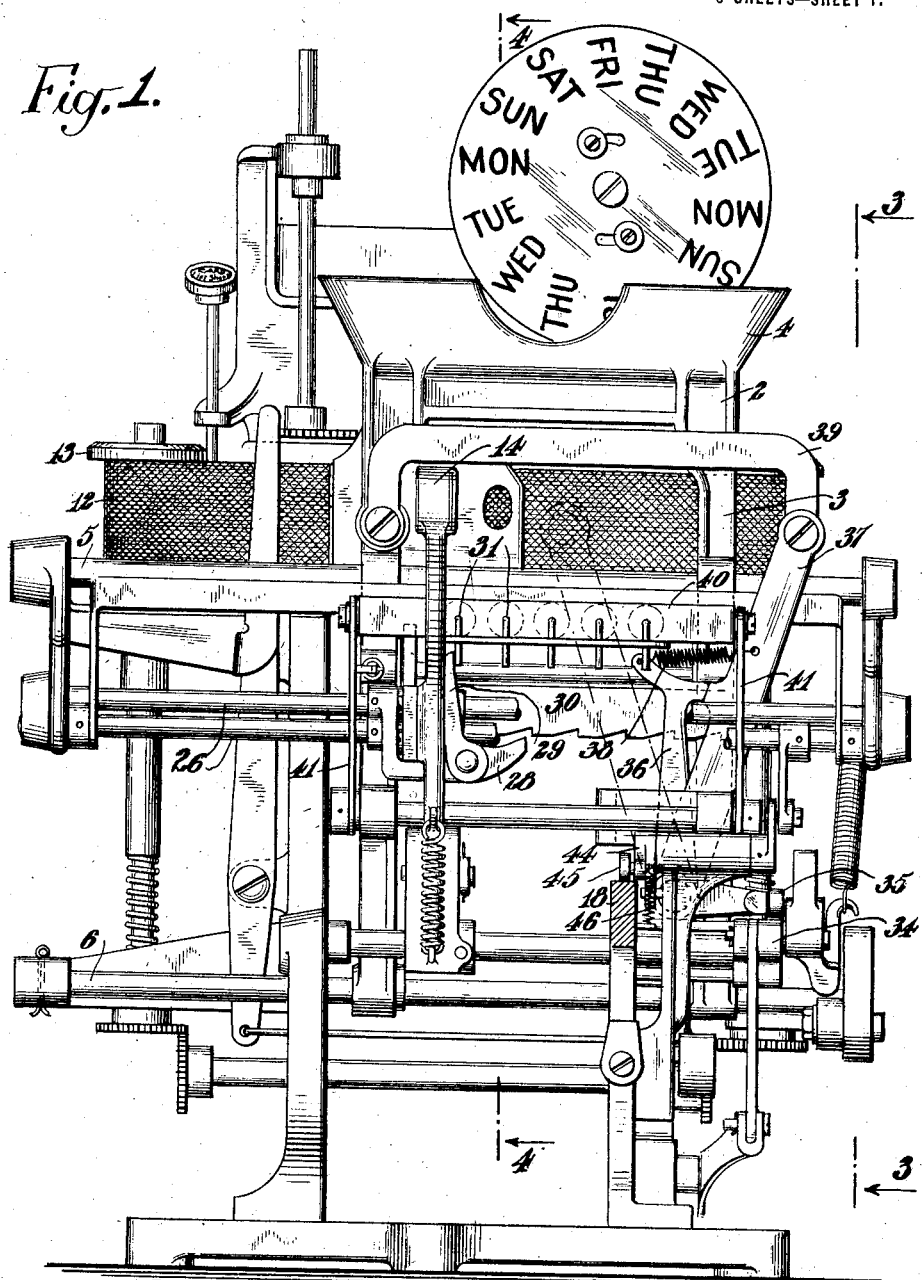

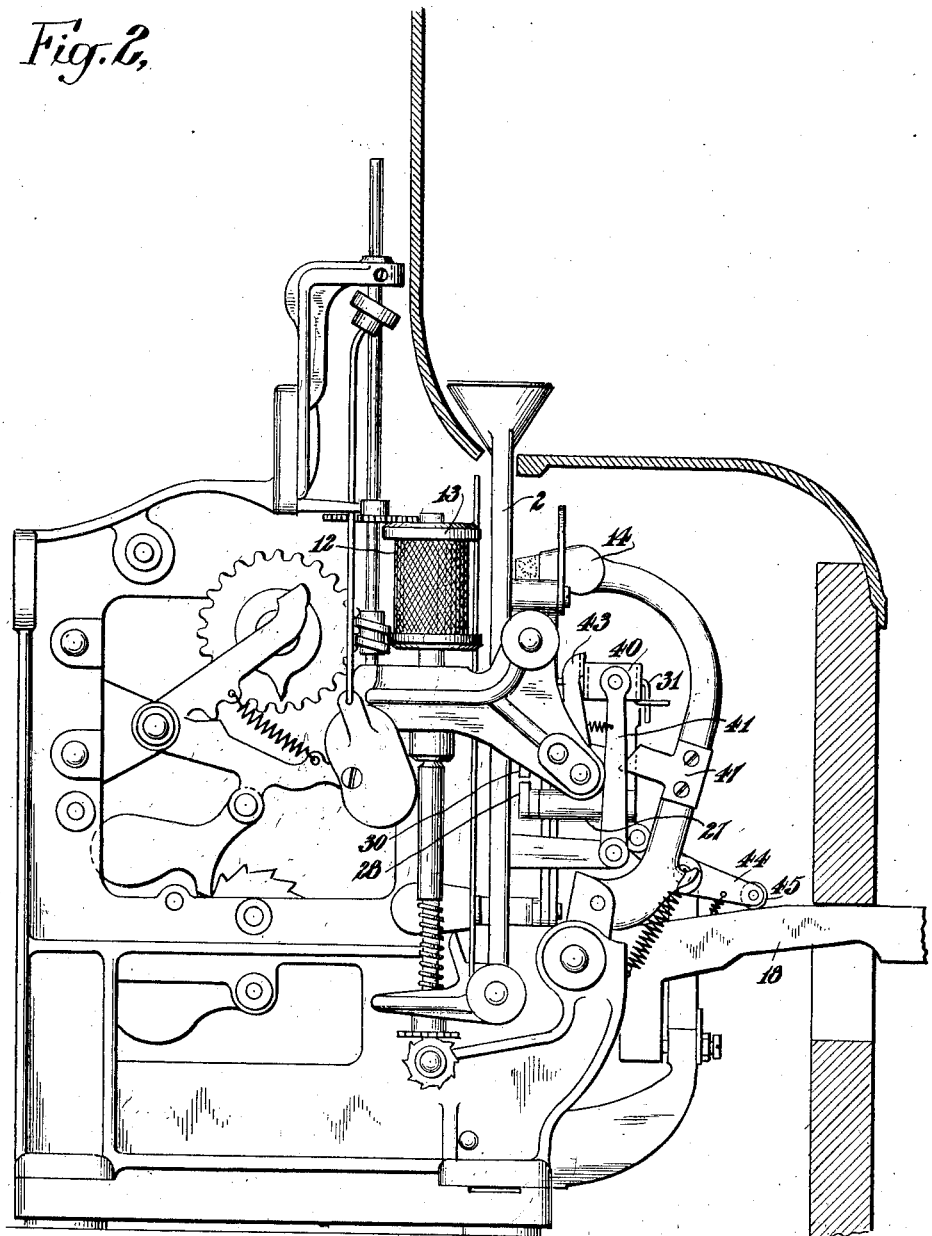

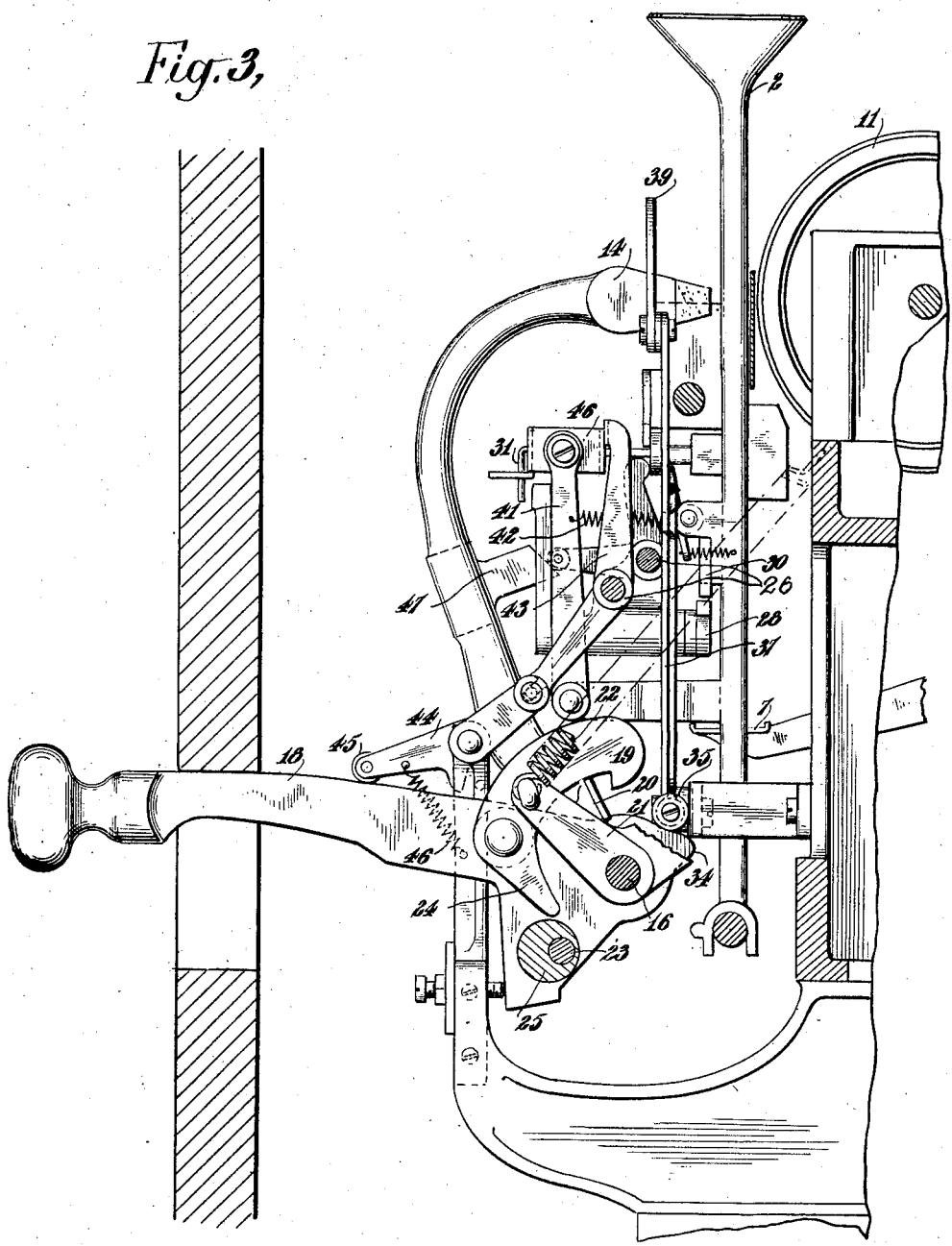

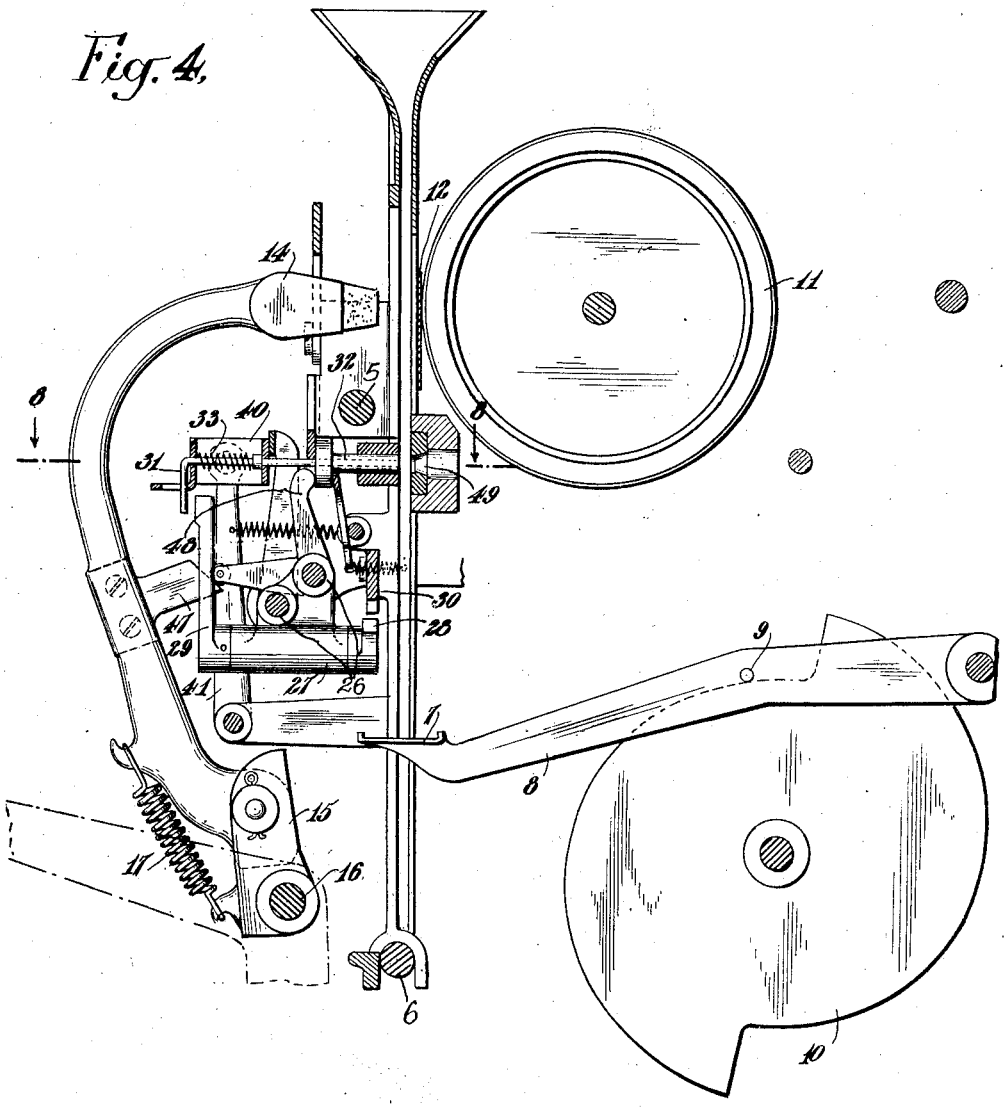

H. T. GOSS AND J. W. BRYCE.
TIME RECORDER.
APPLICATION FILED MAY 8, 1919.
1,348,218.
Patented Aug. 3, 1920.
6 SHEETS—SHEET 6.
Fig. 1,
Week Ending MAY 8 1904  190.
No. 345
NAME
| DAY | MORNING | | AFTERNOON | | OVERTIME | |
|---|---|---|---|---|---|---|
| | IN | OUT | IN | OUT | IN | OUT |
| MON | M 6 45 | M 12 03 | M 12 58 | M 6 05 | | |
| TUE | TU 7 30 | TU 12 15 | TU 12 50 | TU 5 38 | | |
| WED | W 6 42 | W 12 03 | W 12 59 | W 6 00 | | |
| THU | TH 6 48 | TH 12 00 | TH 12 49 | TH 6 10 | | |
| FRI | FR 6 48 | FR 12 07 | FR 12 57 | FR 6 04 | FR 7 00 | FR 9 30 |
| SAT | SA 6 35 | SA 12 02 | SA 12 50 | SA 5 01 | | |
| SUN | | | | | | |
TOTAL TIME _____ HRS
RATE _____
TOTAL WAGES FOR WEEK ____
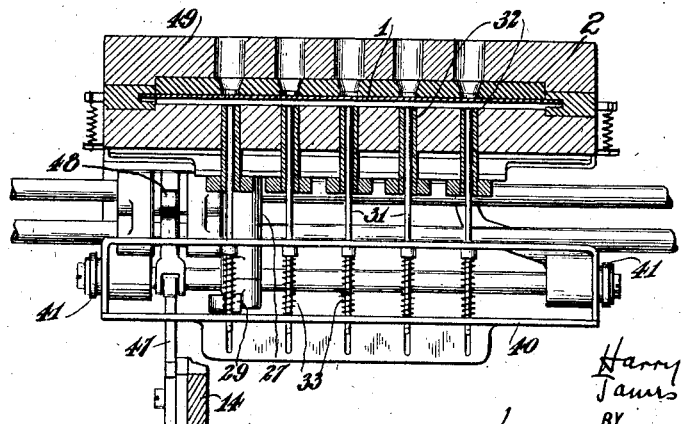
Fig. 6,
INVENTOR
Harry T. Goss
James W. Bryce
BY
Kerr, Page, Cooper & Hayward
ATTORNEY

UNITED STATES PATENT OFFICE.

HARRY T. GOSS, OF RUTHERFORD, NEW JERSEY, AND JAMES W. BRYCE, OF BINGHAMTON, NEW YORK.

TIME-RECORDER.

1,348,218. Specification of Letters Patent. Patented Aug. 3, 1920.

Application filed May 8, 1919. Serial No. 295,765.

*To all whom it may concern:*

Be it known that we, HARRY T. Goss and JAMES W. BRYCE, citizens of the United States, residing at Rutherford, Bergen county, State of New Jersey, and Binghamton, Broome county, State of New York, respectively, have invented certain new and useful Improvements in Time-Recorders, of which the following is a full, clear, and exact description.

In a patent granted on November 5, 1912, No. 1,043,094, on an application filed by us, we have shown and described a time recorder of a type now well-known in this art, and the invention which forms the subject of the present application is an improvement on one form of the recorder shown in that patent.

In general terms, the present improvement is designed to prevent the misuse by workmen of a time-recording device, and comprises means whereby each individual workman, whenever he registers his time on a card which he retains in his possession, no matter when, will always print the time record on a different part of the same. Thus, when a workman arrives in the morning, he inserts his card into the recorder and by the operation of the latter prints the record in the morning or "in" space on the card. The next time he registers, even if immediately after the first registration, the imprint will be made in another space—usually considered the morning or noon "out" space—and so on through the day. On the other hand, another workman, who arrives even after the second registration of one who preceded him, will register his time in the morning "in" space on his card. The adjustment of the machine, in other words, is effected for and by each workman separately and not collectively, so that each time a registration is made by any given employee, the imprint will be in a clean or unprinted space on his card and hence no previously printed record which it may bear can be obliterated or rendered illegible by repeated registrations of the machine.

There are, as is well known, two types of machine commonly employed for this purpose, one known as a dial machine in which the records are printed in the machine upon a record sheet, and the other a card machine in which the records are printed on cards which are retained by the workmen and turned in at given intervals, usually once a week. The present application involves improvements in the latter or card machine, but contemporaneously with this application we are presenting a companion case, Serial No. 295,764, filed May 8, 1919, which is based upon improvements of a broadly similar nature on the first-named or dial machine.

In the accompanying drawings which illustrate our present invention in its most approved and practicable form—

Figure 1 is a front view of a card time-recording machine to which our improvements are applied.

Fig. 2 is a detail view in elevation of the mechanism of Fig. 1 looking from the left.

Fig. 3 is a detail view in section of the hammer mechanism and control means shown in Fig. 1, the section being on line 3—3 of Fig. 1.

Fig. 4 is a detail vertical section showing the punching mechanism, the card lift and selecting mechanism of the in and out control device on the line 4—4 of Fig. 1.

Fig. 5 is a front view of a card-receiver forming a part of the machine.

Fig. 6 is a detail vertical section of a part of the mechanism shown in Fig. 4 but with the parts in a different position.

Fig. 7 shows a record card of the kind used in the recorder of the type now in question.

Fig. 8 is a horizontal section on the line 8—8 of Fig. 4.

The recorder is of a well known type and is fully set forth and described, so far as its main features are concerned, in a patent to Clinton E. Larrabee, No. 935,312, dated September 29, 1909. This renders a more detailed description of the nature of its construction and operation unnecessary in this application than is contained in the following statement.

The records are printed on stiff cards 1, Fig. 7, having horizontal columns for the several days of the week and vertical columns for the in-and-out records. This card, when a registration of time is to be made, is inserted, face to the rear, in a vertical chute or card-receiver 2, in the form of an open frame-work composed of grooved side members 3, and a flaring top 4, the card fitting the receiver rather closely so as to have but little, if any, play therein. The receiver or card-support 2 is mounted to slide horizontally and transversely on upper and lower rails 5 and 6 to move the cards sidewise past the impression point, thus giving the in-and-out spacing, while the day spacing is produced by varying the depth to which the card is inserted in the receiver. For this purpose the bottom of the chute is in the form of an abutment or card lift 7, Fig. 4, carried on the forward end of an arm 8, pivoted at its rear end and having a pin 9 resting on a double cam 10. This cam is revolved by or under the control of a clock mechanism which is not shown herein, at such a rate as to make one complete revolution in two weeks, and its movement is step-by-step so that at the proper instant the abutment 7 will be raised far enough to cause a new day line to stand at the impression point when a card is again inserted into the chute. These parts are all described in detail in the patent last mentioned, and it is sufficient now to point out that the abutment 7, the lever or arm 8 and the cam 10 in the apparatus under consideration constitute clock-controlled or operated means for effecting the day spacing.

The printing wheels are indicated diagrammatically at 11, Fig. 4, and, as in all machines of this class, are clock-driven or controlled by any known means which are not herein illustrated. These printing wheels are arranged behind the card chute 2 near the top thereof and between the wheels and the chute is an ink-ribbon 12 carried by the usual spools 13. The printing hammer 14 is in front of the chute or receiver, and when thrown rearward forces the card and the ribbon smartly against the type-wheels 11, thereby printing a time record on the card in a space thereon determined by its vertical and lateral adjustment with respect to the impression point.

The printing hammer is mounted to swing in a vertical plane by being pivoted at its lower end in a forked arm 15 fixed to a horizontal transverse shaft 16 and is held yieldingly in a forward position, well out of contact with the card in the receiver by a spring 17. Loose on the shaft 16 is a manual operating handle or lever 18 which the workman actuates to effect a registration, and pivoted to the lever or handle is a trip finger 19 arranged to engage a finger 20 rigidly mounted on shaft 16. Fast to the same shaft is an arm 21 connected by a spring 22 which urges the shaft in a clockwise direction, as viewed in Fig. 3, and hence tends to throw the hammer 14 toward the card-receiver 2.

From the foregoing it will be seen that in depressing the handle 18 the pawl or hooked finger 19 engaging the finger 20 will advance the same, thereby rocking the shaft 16 and drawing the hammer back. As the lever is depressed the depending tail 24 of the finger 19 engages a cam stop 25 with the result that the finger or pawl 19 is swung out of engagement with the finger 20, whereupon the arm connected with the spring 22 instantly rocks the shaft 16 bringing the hammer to the position shown in Fig. 3. The hammer being of suitable weight, its momentum is sufficient to carry it beyond this point against the tension of the spring 17, and causes it to strike a sharp blow upon the card, ink-ribbon and type-wheels. The blow having been struck and a time imprint thereby made on the card, the hammer is instantly restored to normal position by the spring 17.

The means of determining the lateral position of any given card with respect to the impression point, and in which resides our present improvement will now be described.

Two rigid rods 26 are fixed in the frame of the machine and support a casting 27, through which passes a stub shaft carrying at one end a pawl 28 and at the other an arm or lever 29. The pawl 28 coacts with a toothed or notched plate 30, which is fast to the laterally movable card-receiver, while the arm 29 is adapted to coöperate with five pins 31 passing and freely movable through five punches 32 supported by the frame in front of the card-chute or receiver 2 and pressed forward by light spiral springs 33, see Fig. 4. The ends of these pins are bent down as shown at 51 in Figs. 1 and 4, and if pressed through a hole in a card will engage lever 29 on the shifting movement of the card receiver as shown in Fig. 6. At other times the bent down ends are clear of lever 29, as shown.

When the handle 18 is pressed down by a workman a cam 34 integral therewith engages a roller 35 carried by one arm of a right-angle lever 36 and by throwing the said roller upward turns the long arm of lever 36 to the left. This lever is connected by a spiral spring 38 to a pivoted arm 37 and normally rests in contact therewith, so that said arm follows the movement of lever 36 under the tension of spring 38. The upper end of the arm 37 is pivotally connected by a link 39 with the card-receiver 2 and when moved imparts movement to the left of said card-receiver across the impression point.

The pins 31 are carried by a frame 40 supported by a pivoted lever 41 to which a spiral spring 42 imparts a tendency to swing toward the card-chute or receiver. Bearing on the frame 40, however, is a lever 43 pivoted to a casting carried by one of the rods 26 and having a downwardly extending portion below its fulcrum pivotally connected with provision for lost motion with a bell crank lever 44 pivoted to the frame and carrying a roller 45 which is held by a spiral spring 46 in contact with the handle 18. These parts act to force the pin frame 40 to the left and normally holds the pins out of contact with a card in the chute.

When a workman registers his time, he inserts a card face to the rear in the receiver and operates the handle 18. This throws the receiver to its extreme position to the right, assuming the registration to be the first in the morning, and the man's "in" time will accordingly be printed at the proper point on the card. The movement of the handle for accomplishing the printing allows the bell crank lever 44 to drop and releases and throws the lever 43 rotating it clockwise, and this permits the spring 42 to move the pin frame to the right and bring all the spring-actuated pins against the card. Under the assumption, this being the first registration of the day, there will be no perforations in the card and hence all of the pins will be forced back against their springs and no pin will therefore encounter the upright arm 29, which, being supported by the frame, is stationary with respect to the card-receiver which carries the pins and punches.

On the hammer arm 14 is a cam plate 47 and when the hammer is thrown to print, this cam strikes a roller on the end of a bell crank lever 48 which engages with a flange on the end of the last punch on the right hand end of the row and forces it through the card and its die 49 and punches a hole in the card at the point 50 which is on the left hand side of the card when removed or in that horizontal line. This statement applies only, it will be understood, if the operation be the first one of the machine in the morning, and should be modified to apply to such subsequent operations by which the card receiver is advanced.

Whether the card be then removed or not, if the workman again operates the handle, the parts are operated as before but when the pins are allowed to move toward the card, that pin which lies over this hole last punched will pass through the card, while all the others will be forced back. Hence, as the card-receiver is moved transversely the turned-down end of this pin will encounter the upright arm 29 and turn the same and together with it the pawl 28 at the proper moment to bring said pawl into engagement with the first tooth of the plate 30 and arrest the card-receiver one step before it has completed its full movement. This is the condition after the first punching, as obviously after another punching the card receiver will be stopped two steps before the end of its movement. The connection between the lever 36 and the arm 37 is such that the handle is not stopped but makes its full movement, but the imprint is not in the "morning in" but in the "morning out" space on the workman's card.

For every operation thereafter on this particular card the receiver will be stopped to present a different "in" and "out" space to the printing point, for at each operation a hole is punched one step in advance and the pin to the right which passes through the last hole punched determines the point at which the next record will be printed.

It is manifest that what happens in the case of one card happens to all, and for each first insertion of a card the imprint will be in the "morning in" space and for each subsequent insertion in an adjoining space. No employee can alter this and it is not possible for him to make false returns or records.

The other parts of the machine herein shown are known in the prior art and require no further explanation. The means we have shown for stopping the card-receiver at different points so as to receive the impression on a clean part of a card and for punching holes at successively advanced points in such card may be varied in many respects without departure from the invention.

This apparatus fills a great want in mechanism of this kind and type and may be applied to many forms of card-machine. By its use all tampering with or improper use of the time-recorder on the part of dishonest workmen is effectually prevented, and but a very slight expense is involved in its application.

What we claim is:—

1. In a time-recording machine for workmen's cards, the combination with the means for operating the same and a card receiver movable transversely to the impression point thereby, of a row of punches carried by or with the receiver, a series of spring-actuated pins passing through said punches, a pivoted stationary arm and means controlled by its movement when encountered by a pin which has passed through a previously punched hole in a card to arrest the card-receiver at a point with reference to the impression point determined by the position of the punched hole in the card.

2. In a time-recording machine for workmen's cards, the combination with an operative handle and a card-receiver movable transversely to the impression point by the movement of said handle, a pin holder, and a row of punches through which said pins extend carried by the card-receiver, a stationary arm, a shaft to which said arm is fixed, and a pawl fixed to said arm, and a toothed plate carried by the card-receiver adapted to be engaged and stopped by said pawl when the arm which operates the same is encountered and moved by any pin which by passing through a previously punched hole in a card is thereby brought into a position to engage said arm.

3. In a time-recording machine for workmen's cards, the combination with an operating handle and a card-receiver movable thereby transversely across the impression point, of a row of punches carried by said receiver, spring-actuated pin-holder normally impelled toward the receiver, a series of spring-actuated pins carried thereby and passing through the punches, a lever normally forcing back the pin-holder so as to keep the pins out of contact with the card and adapted to be moved to release said holder by the movement of the operating handle, a pivoted stationary arm, a pawl actuated thereby, and a toothed plate on the card-receiver which is engaged by said pawl when the said arm is moved by any pin whose position has been changed by its passage through a previously punched hole in a card.

4. In a time-recording machine for workmen's cards, the combination with means for operating the same and a card-receiver movable transversely past the impression point thereby, of means for arresting the card-receiver at points determined by the position of previously punched holes in a card, a row of punches carried by the card-receiver, a printing hammer and means operated thereby for operating the particular punch which by the transverse movement of the card-receiver may at the time of the impression lie under it.

5. In a time-recording machine for workmen's cards, the combination with means for operating the same, and a card receiver movable transversely past the impression point thereby, of means for arresting the card-receiver at points determined by the position of previously punched holes in a card, a row of punches carried by the card-receiver, a printing hammer having a cam projection and a lever adapted to be engaged by said projection and to engage and operate any punch which by the movement of the card-receiver may at the moment of impression be under it.

In testimony whereof we hereunto affix our signatures.

HARRY T. GOSS.
JAMES W. BRYCE.